United States Patent
Nagasawa et al.

[11] Patent Number: 5,895,122
[45] Date of Patent: Apr. 20, 1999

[54] STILL IMAGE REPRODUCING APPARATUS

[75] Inventors: Kenichi Nagasawa; Shigeo Yamagata; Hiroyoshi Misumi, all of Kanagawa-ken, Japan

[73] Assignee: Canon Kabushiki Kaisha, Tokyo, Japan

[21] Appl. No.: 08/195,607

[22] Filed: Feb. 14, 1994

Related U.S. Application Data

[63] Continuation of application No. 07/669,890, Mar. 14, 1991, abandoned.

[30] Foreign Application Priority Data

Mar. 19, 1990 [JP] Japan ..................... 2-70942
Mar. 19, 1990 [JP] Japan ..................... 2-70943

[51] Int. Cl.$^6$ ..................................... H04N 5/91
[52] U.S. Cl. .................. 386/81; 386/117; 360/72.1
[58] Field of Search ..................... 360/10.3, 72.2, 360/74.4, 27, 71, 72.1, 73.01, 73.04, 73.05, 74.1, 35.1; 386/69, 81, 117; 358/906, 909.1

[56] References Cited

U.S. PATENT DOCUMENTS

| | | | |
|---|---|---|---|
| 3,789,138 | 1/1974 | Terada | 360/74.1 X |
| 4,789,961 | 12/1988 | Tindall | 364/900 |
| 4,816,940 | 3/1989 | Nagasawa et al. | 360/72.2 X |
| 4,845,577 | 7/1989 | Georgis et al. | 360/72.2 |
| 4,912,571 | 3/1990 | Sekiya et al. | 360/10.3 |
| 4,958,244 | 9/1990 | Inazawa et al. | 360/72.1 |
| 4,962,435 | 10/1990 | Furuta | 360/72.2 |
| 5,036,410 | 7/1991 | Renders et al. | 360/72.2 |
| 5,050,018 | 9/1991 | Georgis et al. | 360/74.4 X |
| 5,097,363 | 3/1992 | Takei et al. | 360/10.3 |

FOREIGN PATENT DOCUMENTS

| | | |
|---|---|---|
| 0323890 | 12/1989 | European Pat. Off. |
| 2336405 | 1/1974 | Germany |
| 2924696 | 1/1980 | Germany |
| 3742471 | 5/1989 | Germany |

*Primary Examiner*—Andrew L. Sniezek
*Attorney, Agent, or Firm*—Robin, Blecker & Daley

[57] ABSTRACT

The present invention is intended to solve a problem which may be encountered during a transfer from a mode for searching a desired still image to a mode for performing actual reproduction during the process in which still image information is reproduced from a tape-shaped recording medium on which a multiplicity of helical tracks are formed for one picture of still image information, one picture of still image information and address information indicative of the number thereof being recorded in the multiplicity of helical tracks. The sensation of an operator can be made coincident with an actually reproduced still image, for example, by effecting such mode transfer by detecting and using a number adjacent to a desired still image number or by shifting the tape-shaped recording medium by a predetermined amount. Accordingly, it is possible to to search a desired still image rapidly and easily.

24 Claims, 6 Drawing Sheets

STILL IMAGE REPRODUCING APPARATUS

This is a continuation application under 37 CFR 1.62 of prior application Ser. No. 669,890, filed Mar. 14, 1991, now abandoned.

BACKGROUND OF THE INVENTION

1. Field of the Invention

The present invention relates to an apparatus for reproducing a still image from a tape-shaped recording medium on which a still image for one picture is recorded in a multiplicity of helical tracks.

2. Description of the Related Art

In general, recording and reproduction of still image information has no limitation of time which may be experienced in recording and reproducing of a moving image. Accordingly, if a memory for at least one picture is incorporated into a digital recording and reproducing apparatus which operates at a low bit rate, it is possible to record and reproduce still image information by using such a low-bit-rate apparatus. As an example of the digital recording and reproducing apparatus, an apparatus is proposed which records and reproduces an audio-rate digital signal on a tape-shaped recording medium by means of a rotary head. The proposed apparatus is arranged to record a still image for one picture over an interval of several seconds, i.e., in several hundred tracks. For example, U.S. patent application Ser. No. 937,872 filed on Dec. 4, 1986 abandoned discloses this kind of apparatus.

In such an apparatus, a search function is important since an excessively large number of still images are recorded on a single tape. Various types of search techniques is possible, and one example is a technique in which a number is assigned to each still image or a still image recording area on a tape-shaped recording medium and the numbers are recorded on the recording medium as address information. A desired still image is searched by reproducing the address information while transporting the tape-shaped recording medium at a high speed.

In another technique, a signal is reproduced by a rotary head while a tape-shaped recording medium is being transported at a high speed, and only pixels which are reproduced from among all pixels are used to form one picture, whereby still images are displayed one after another. The technique of obtaining a reproduced image by using only reproduced pixels from among all pixels is known in the field of digital VTRs for recording and reproducing moving images. Such a technique makes it possible to obtain a reproduced image of sufficient quality which can be utilized as a search image for the moving images.

However, in a case where the technique utilizing the aforesaid address information is applied to the above-described still image reproducing apparatus, even if normal reproduction is started when address information corresponding to the number of a desired still image is reproduced, still image information corresponding to the address information cannot be completely reproduced. This is because tracing has already passed through the tracks positioned in an area in which the still image is recorded.

In the technique of obtaining a reproduced image by using only reproduced pixels from among all pixels, if a still image is searched while viewing a picture reproduced during high-speed search reproduction, a track in which the desired still image is recorded will have been passed when the still image has been reproduced. In addition, since it appears to an operator that there is no correlation between still images recorded on the tape-shaped recording medium, if the operator desires to reproduce a particular still image during the high-speed search reproduction, he must memorize still images before and after the desired still image. Such an operation will be a great burden to the operator.

SUMMARY OF THE INVENTION

It is, therefore, an object of the present invention to solve the above-described problems.

Another object of the present invention is to provide a still image reproducing system capable of easily extracting a desired still image by a simple operation from a tape-shaped recording medium on which a still image for one picture is recorded in a multiplicity of helical tracks.

To achieve the above-described objects, according to one aspect of the present invention, there is provided a still image signal reproducing apparatus which comprises a reproducing head for tracing a tape-shaped recording medium on which a multiplicity of helical tracks are formed for one picture of still image information, one picture of still image information and address information indicative of the number thereof being recorded in the multiplicity of helical tracks, transporting means for transporting the tape-shaped recording medium in the longitudinal direction thereof, still image reproducing means for reproducing the still image information by using an output from the reproducing head, address reproducing means for reproducing the address information by using the output from the reproducing head, address inputting means for inputting desired address information, and mode switching means for switching the apparatus between a plurality of modes including a search mode and a reproduction mode. When the apparatus is in the reproduction mode, the transporting means transports the tape-shaped recording medium at a first speed and the still image reproducing means reproduces the still image information. When the apparatus is in the search mode, the transporting means transports the tape-shaped recording medium at a second speed which is faster than the first speed and the address reproducing means reproduces the address information. When the apparatus is in the search mode, the mode switching means effects mode switching from the search mode to the reproduction mode if the address information reproduced by the address reproducing means coincides with address information adjacent to the desired address information inputted from the address inputting means.

According to another aspect of the present invention, there is provided a still image signal reproducing apparatus which comprises a reproducing head for tracing a tape-shaped recording medium on which a multiplicity of helical tracks are formed for one picture of still image information, one picture of still image information and address information indicative of the number thereof being recorded in the multiplicity of helical tracks, transporting means for transporting the tape-shaped recording medium in the longitudinal direction thereof, still image reproducing means for reproducing the still image information by using an output from the reproducing head, mode switching means for switching the apparatus between a plurality of modes including a high-speed reproduction mode and a normal reproduction mode, and controlling means for causing the transporting means to transport the tape-shaped recording medium by a predetermined amount in a direction opposite to a direction in which the tape-shaped recording medium is transported in the high-speed reproduction mode, if the mode switching means switches the apparatus from the high-speed reproduction mode to the normal reproduction mode. When the apparatus is in the normal reproduction mode, the transporting means transports the tape-shaped recording medium at a first speed and the still image reproducing means reproduces the still image information by using all pixel information recorded in the multiplicity of helical tracks. When the apparatus is in the high-speed reproduction mode, the transporting means transports the tape-shaped recording medium at a second speed which is faster than the first speed and the still image reproducing means reproduces the still image information by using only a portion of pixel information recorded in the multiplicity of helical tracks.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
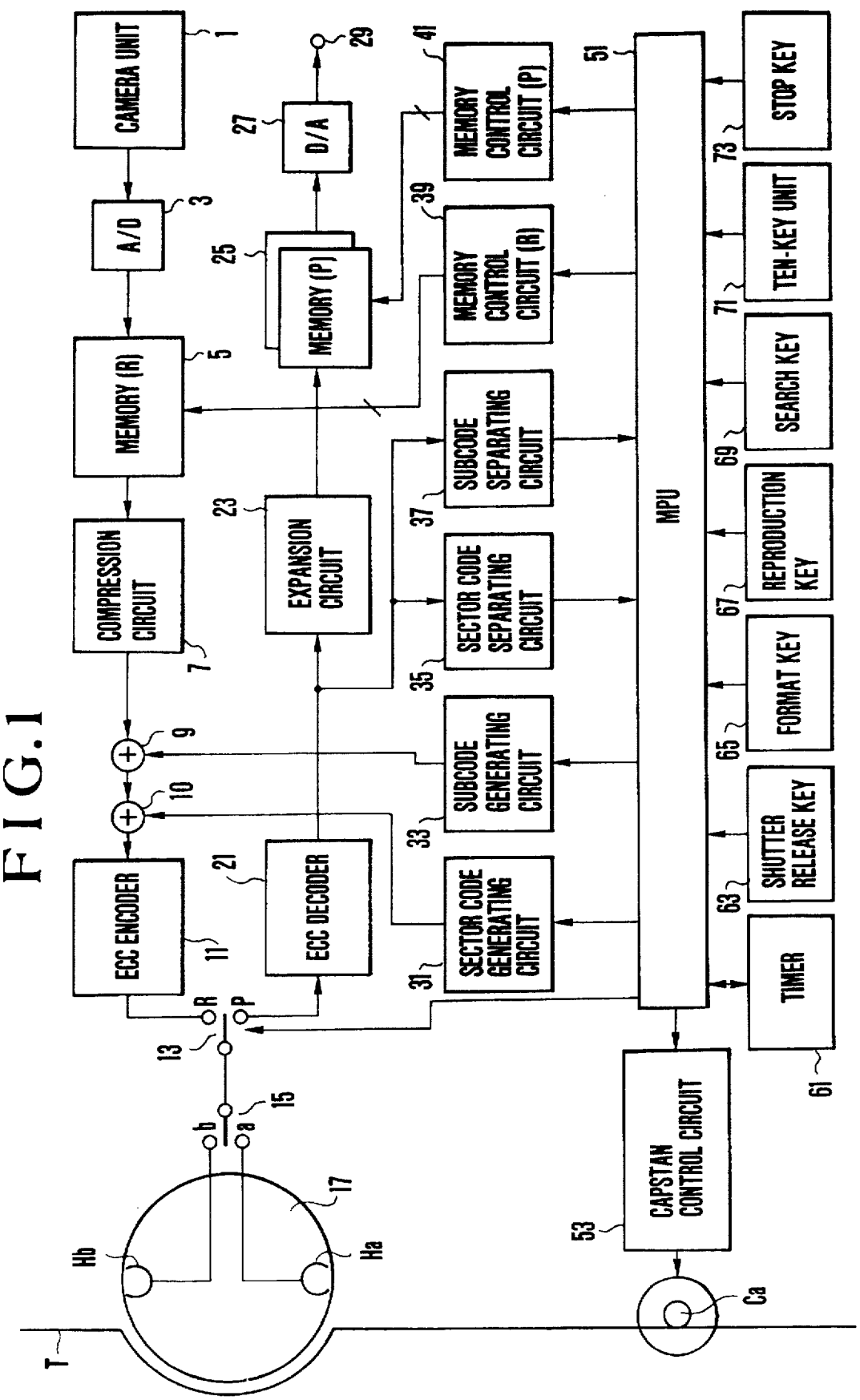
FIG. 1 is a schematic block diagram showing a digital still image recording and reproducing apparatus according to a first embodiment of the present invention.

FIG. 1 is a schematic block diagram showing a digital still image recording and reproducing apparatus according to a first embodiment of the present invention. The recording format formed on a tape by the apparatus of FIG. 1 is partially schematically shown in FIG. 2.

In the apparatus shown in FIG. 1, a magnetic tape is indicated by symbol T, and rotary heads Ha and Hb rotate at 3600 r.p.m and have different azimuth angles. The magnetic tape T is guided through a predetermined angle range (approximately 120 degrees in the example of FIG. 1) around a rotary cylinder member 17 provided with the rotary heads Ha and Hb. A capstan Ca transports the tape T in the longitudinal direction thereof, and a capstan control circuit 53 controls the capstan Ca in accordance with an instruction sent from a microprocessing unit (MPU) 51.

A switch 13 is controlled by the MPU 51 so that it selectively makes a connection to an "R" side for a recording operation and to a "P" side for a reproduction operation. A switch 15 selectively makes a connection to an "a" side when the head Ha traces the tape T and to a "b" side when the head Hb traces the tape T.

The shown apparatus also includes a timer 61, a shutter release key 63, a format key 65, a reproduction key 67 for input of a normal-reproduction command, a search key 69 for input of a search command, a ten-key unit 71 for designation of addresses, and a stop key 73.

In the apparatus according to the first embodiment, a surface of a tape-shaped recording medium is divided into a multiplicity of sectors in the longitudinal direction thereof so that a still image signal for one picture can be recorded on each sector.

First of all, a sector forming operation, i.e., a formatting operation will be explained.

When the format key 65 is operated with the tape T rewound, the MPU 51 causes a sector code generating circuit 31 to generate sector codes for several tracks. The contents of such a sector code include various information such as sector number information indicative of the number of each area which is formed as a sector. The sector code is recorded in each sector code area indicated by SC1, SC2 and SC3 as partly shown in FIG. 2. It is sufficient that an area for several tracks is allocated for one sector code area.

Each time recording for one sector code area is started, the MPU 51 resets the timer 61, and when a predetermined time T has passed after the resetting, recording of a sector code in the succeeding sector code area is started. This operation is repeated until the trailing end of the tape T is reached, whereby formatting is completed.

Figure 3:
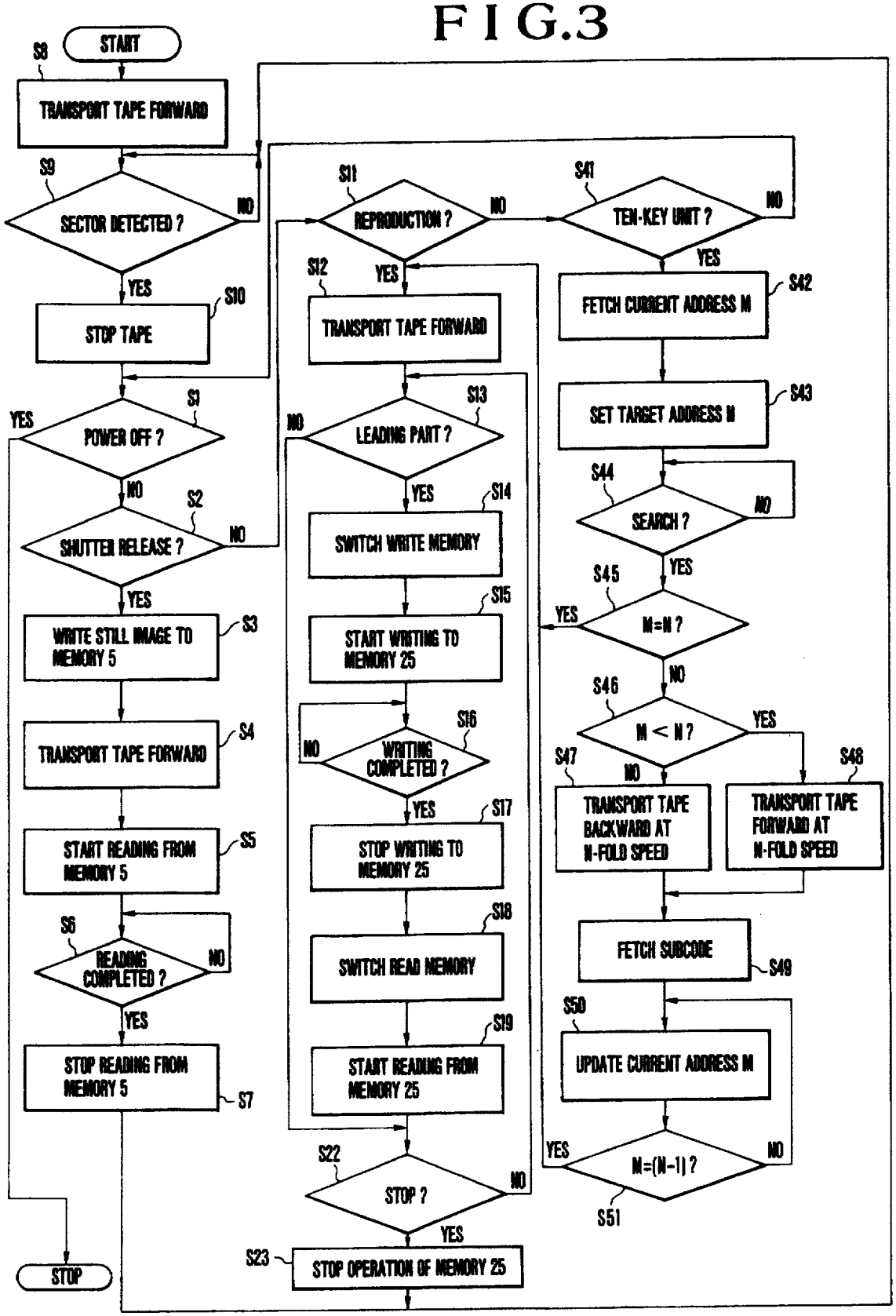
FIG. 3 is a flowchart showing the operation of the microprocessing unit (MPU) 51 shown in FIG. 1.

FIG. 3 is a flowchart showing the operation of the microprocessing unit (MPU) 51 shown in FIG. 1, and the operation of the MPU 51 will be explained below with reference to the flowchart in the order: recording, reproduction and search.

First of all, the operation of the MPU 51 during recording will be explained. When a power switch (not shown) is turned on, the flow of FIG. 3 is started to cause the capstan control circuit 53 to transport the tape T forward at a predetermined speed (Step S8). The rotary heads Ha and Hb are set to their reproduction states to extract a sector code by means of a sector code separating circuit 35. During this time, the reproduced signals outputted from the heads Ha and Hb are supplied to the sector code separating circuit 35 through the switch 15, the "P" side of the switch 13 and an ECC decoder 21 which will be described later.

If the MPU 51 detects that the heads Ha and Hb are tracing sector code areas, on the basis of the sector code supplied from the sector separating circuit 35 (Step S9), the MPU 51 stops the tape T (Step S10) and places the apparatus in its operation ready state. In the above-described manner, recording or reproduction which will be described later is started at the leading end of each sector.

When the apparatus is in the operation ready state, if the shutter release key 63 is operated (Step S2), an image signal for one frame contained in the video signal outputted from the camera unit 1 is converted into a digital signal by an A/D converter 3 and written to a frame memory 5 (Step S3). At this time, the MPU 51 causes a memory control circuit (R) 39 to hold the memory (R) 5 in a write-enable state for a one-frame period.

The MPU 51 causes the capstan control circuit 53 to transport the tape T forward at a predetermined speed (Step S4), and causes the memory control circuit (R) 39 to expand the one-frame video signal written in Step S3 along the time axis thereof up to several hundred times and read the result from the memory (R) 5 (Step S5). The signal read from the memory (R) 5 is supplied to a band compression circuit 7, where it is subjected to well-known digital band compression processing such as high-efficiency encoding.

In the meantime, the MPU 51 causes a subcode generating circuit 33 to generate subcodes such as address information indicative of the location of a still image, which is being recorded, as counted from the leading end of the tape T and track information indicative of the location of a track in which recording is being performed, among all still image recording tracks. The compressed still image information outputted from the band compression circuit 7 and the subcodes supplied from the subcode generating circuit 33 are subjected to time-division multiplexing for each track in an adder 9. The code string obtained by the time-division multiplexing in the adder 9 is supplied to an ECC (error correction code) encoder 11, where it is formed into a well-known ECC such as a Reed-Solomon code. The ECC encoder 11 provides a digitally modulated output at its output terminal, and supplies it to the "R" side terminal of the switch 13 as a signal to be recorded.

Figure 2:
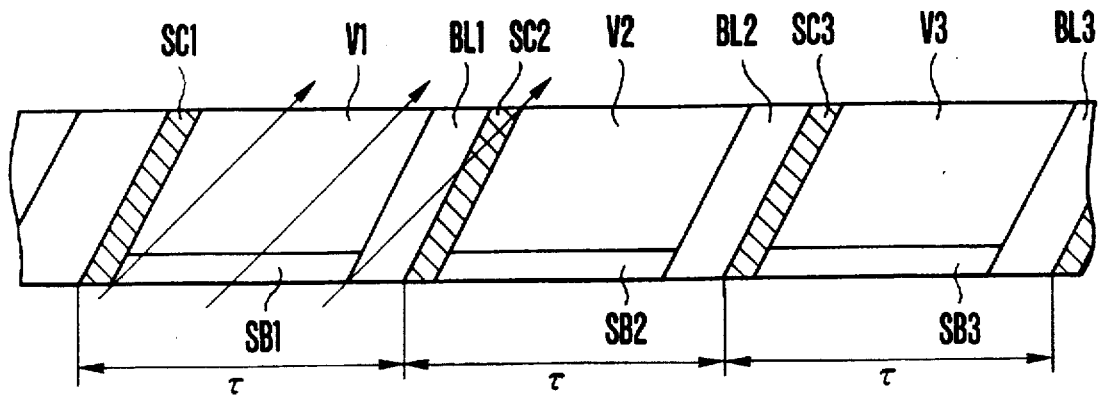
FIG. 2 is a partial schematic view showing a recording format formed on a tape by the apparatus of FIG. 1.

The signal to be recorded, which has been passed through the "R" side terminal of the switch 13, is supplied to the heads Ha and Hb through the switch 15. The signal thus supplied is recorded on the tape T by the heads Ha and Hb as shown in FIG. 2. In FIG. 2, symbols V1 to V3 denote still image areas in each of which compressed still image information for one frame is recorded, and a multiplicity of (several hundred) helical tracks are formed in each of the still image areas V1 to V3. Each of the tracks has a subcode recording part at one longitudinal end, and a group of subcode recording parts constitutes each subcode recording area SB1 to SB3, the group corresponding to a set of helical tracks in which a still image for one frame is recorded. The aforesaid address and track information is necessarily recorded on the subcode recording part of each track. BL1 to BL3 denote the blank parts of respective sectors.

If the reading of still image information for one frame from the memory (R) 5 is completed (Step S6), the reading from the memory (R) 5 is stopped (Step S7). In the above-described manner, the recording of one frame of still image information in one of the still image areas V1 to V3 on the tape T is completed, and the recording of the associated subcode on one of the subcode areas SB1 to SB3 is completed.

After completion of the recording of one frame of still image information, the tape T continues to be transported forward. More specifically, in this state, the process returns to Step S9, where it is detected whether the heads Ha and Hb are tracing a sector code area. If it is detected that the heads Ha and Hb are tracing the sector code area, the tape T is stopped (Step S10) and the process causes the apparatus to return to the above-described operation ready state.

The operation of the still image recording and reproducing apparatus according to the first embodiment during normal reproduction will be described below.

When the reproduction key 67 is operated in the above-described operation ready state (Step S11), the MPU 51 causes the capstan control circuit 53 to transport the tape T forward at a predetermined speed (Step S12). The transporting speed during the normal reproduction is generally the same as that during recording, but the tape T may be transported at any speed that allows still image information on each track to be stably reproduced.

The signals reproduced by the rotary heads Ha and Hb are supplied to the ECC decoder 21 through the switch 15 and the "P" side terminal of the switch 13. The supplied signals are digitally demodulated in the input stage of the ECC decoder 21, and then corrected for code error. The code string which has been corrected for code error by the ECC decoder 21 is supplied to a band expansion circuit 23 and a subcode separating circuit 37. The subcode separating circuit 37 separates the address information, the track information and the like and supplies such information to the MPU 51. The band expansion circuit 23 effects band expansion processing which is reverse to the band compression processing performed by the aforesaid band compression circuit 7, and inputs the band-expanded code string into one of two memories (P) 25 each consisting of a frame memory.

If the process proceeds from the aforesaid operation ready state to Step S12, the rotary heads Ha and He are positioned on a particular sector code area. If transport of the tape T is started, the MPU 51 receives from the subcode separating circuit 37 the track information recorded in a subcode area, and monitors such track information. If it is detected that a track to be reproduced is the first track of each still image area, this indicates that the leading part of each still image area has been detected (Step S13). The memory control circuit (P) 41 sets a write memory by switching the two frame memories 25 from one to the other (Step S14), and writing of still image information to the frame memory which has been set as the write memory by the memory control circuit (P) 41 is started (Step S15). In other words, according to the first embodiment, still image information is memorized in either of the two frame memories 25 in sequence from the information recorded on the leading track of each still image area.

When the writing of still image information for one frame is completed (Step S16), the writing to the switched frame memory is completed (Step S17), and the frame memory to which the still image information has been written is in turn set as a read memory (Step S18). Then, reading of the still image information from the frame memory is started (Step S19). At this time, the still image signal is repeatedly read from the frame memory at the original video rate, converted into an analog video signal by a D/A converter 27, and outputted from an output terminal 29 to a monitor device or the like.

The transport of the tape T is continued in the above-described reproduction state. If, in such a state, the leading part of each still image area is again detected (Step S13), the process proceeds to Step S14, where the write memory is switched from the frame memory, whose contents are being read out, to the other frame memory, and a similar operation is carried out.

In the above-described manner, each time one frame is completely reproduced from one still image area, the next still image signal is outputted. Accordingly, a still image signal is always provided at the output terminal 29.

If the stop key 73 is operated in such a normal-reproduction state (Step S22), writing to and reading from the memories (P) 25 are stopped (Step S23), thereby bringing the reproduction operation to an end. The process returns to Step S9, and if it is detected that the heads Ha and Hb are tracing a particular sector area, the tape T is stopped (Step S10). The process causes the apparatus to return to the above-described operation ready state.

The operation of the apparatus in a search mode will be explained below.

In the first embodiment, when the apparatus is in the operation ready state, the rotary heads Ha and Hb are necessarily positioned in the aforesaid sector code area. If operation of the ten-key unit 71 is initiated when the apparatus is in the operation ready state (Step S41), the MPU 51 detects the number of a sector, i.e., the number of the still image recorded on the sector, on the basis of the sector number information contained in a sector code supplied from the sector code separating circuit 35, and assigns the detected number to a variable M as current-address information (Step S42). An address desired to be searched, which is specified through the ten-key unit 71, is assigned to a variable N as a target address (Step S43).

Subsequently, if the search key 69 is operated (Step S44) to cause the apparatus to transfer to a search mode, the variable M is compared with the variable N. If M=N (Step S45), the flow transfers to Step S12, where the process causes the apparatus to directly transfer to a normal reproduction mode. In consequence, the still image recorded in a still image area having an area number N is initially reproduced to reproduce the desired still image.

If M<N (Step S46), the MPU 51 causes the capstan control circuit 53 to rotate the capstan Ca at a high speed, thereby transporting the tape T forward at a speed n times as high as the transporting speed during recording (Step S48). Unless M<N, the MPU 51 determines that M>N, and causes the capstan control circuit 53 to rotate the capstan Ca at a similar high speed, thereby transporting the tape T backward at a speed n times as high as the transporting speed during recording (Step S47).

In the above-described state, although the loci of traces of the respective heads Ha and Hb intersect the longitudinal axes of the respective tracks as indicated by arrows in FIG. 2, it is possible to extract a subcode from a subcode area corresponding to each still image area at least once. In this state, the MPU 51 receives from the subcode separating circuit 37 the aforesaid address information contained in the subcode (Step S49) and updates the current-address variable M on the basis of such address information. The variable M updated in this step is compared with a number (N−1) which is smaller than the target address N by one (Step S51). If it is determined in Step S51 that M=(N−1), the flow proceeds to Step S12, whereby the process causes the apparatus to transfer to the normal reproduction mode.

The reason why the variable M is compared with not the target address N but the value (N−1) will be described below. Since the subcode is, as described above, repeatedly recorded over the entire subcode area corresponding to each still image area, it is substantially impossible to find the track of any sector which is being traced by the rotary heads Ha and Hb at the instant when the variable M is updated. Also, since perfect still images cannot be reproduced if normal reproduction is started at the middle of each sector, writing to either of the memories 25 (P) is, as described above, started with the leading track of each still image area during normal reproduction in the first embodiment. Therefore, if the process causes the apparatus to transfer to the normal reproduction mode when the variable M coincides with the target address N, actual reproduction starts with the still image recorded at the area (address) number (N+1).

As is apparent from the foregoing description, the current-address variable M is varied in sequence during the high-speed transport of the tape T, and when the variable M reaches (N−1), the process causes the apparatus to transfer to the normal reproduction mode. After the leading track of the next still image area whose still image information is to be reproduced has been detected in Step S13, writing of the information to the memory (P) 25 is performed. In consequence, the desired still image is reproduced.

If a power switch (not shown) is turned off when the apparatus is in the aforesaid operation ready state, (Step S1), the processing according to the flowchart of FIG. 3 is brought to an end.

According to the apparatus of the above-described embodiment, when a desired still image is to be searched while the tape T is being transported at a high speed, an operator can easily search a desired picture without performing a time-consuming operation such as the operation of reversing the running direction of the tape T.

Figure 5:
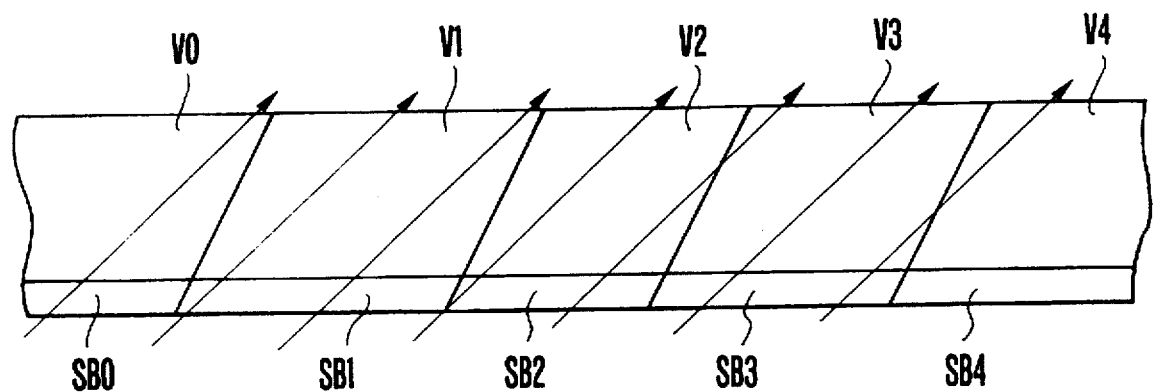
FIG. 5 is a partial schematic view showing a recording format formed on a tape by the apparatus of FIG. 4.
Figure 4:
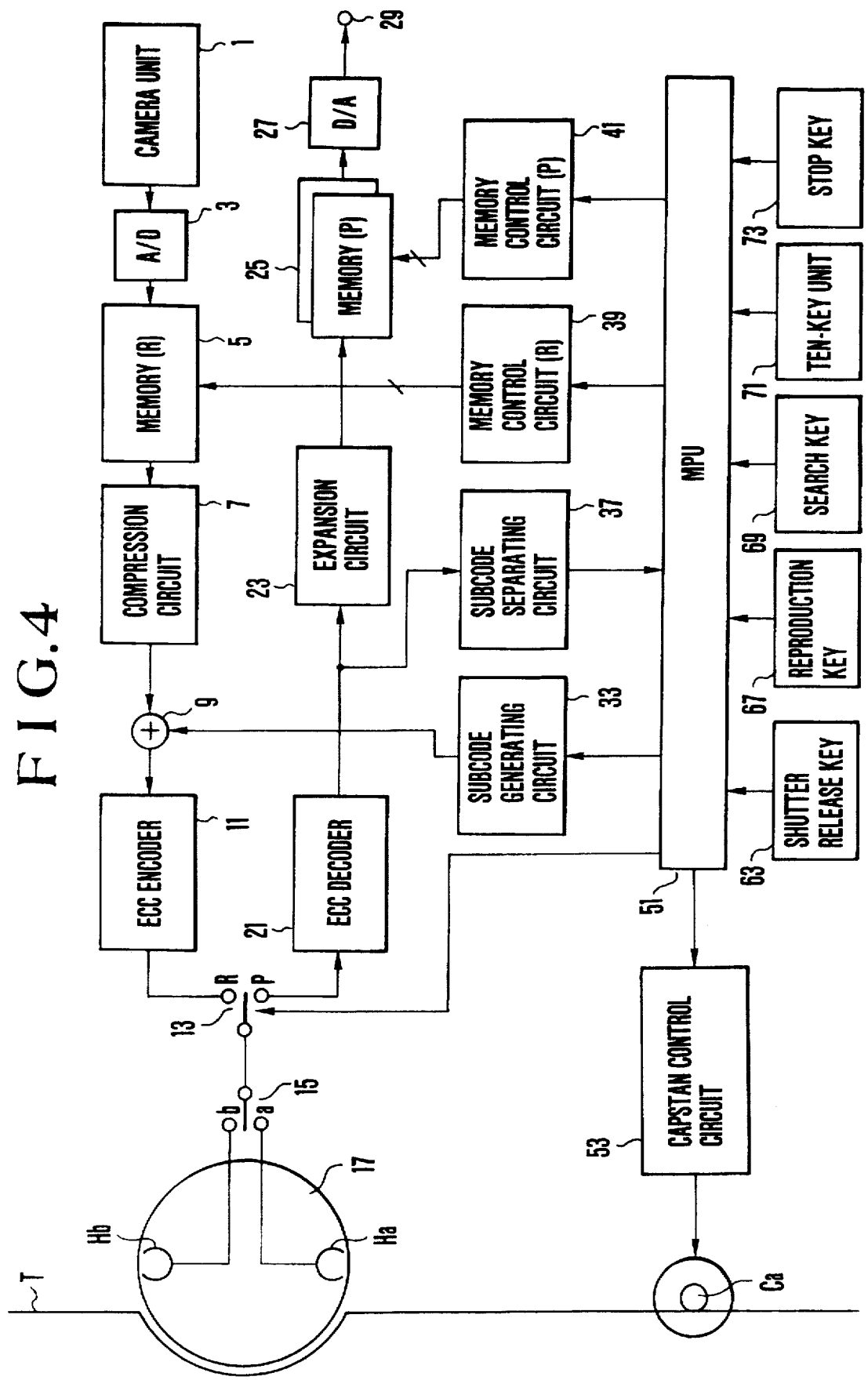
FIG. 4 is a schematic block diagram showing a digital still image recording and reproducing apparatus according to a second embodiment of the present invention.

FIG. 4 is a schematic block diagram showing a digital still image recording and reproducing apparatus according to a second embodiment of the present invention. The recording format formed on a tape by the apparatus of FIG. 4 is partially schematically shown in FIG. 5. In FIGS. 4 and 5, like reference numerals are used to denote elements which are substantially identical to those shown in FIGS. 1 and 2, and detailed description is omitted.

As can be seen from FIG. 5, in the apparatus of the second embodiment, no sector formation is carried out and a multiplicity of still images are recorded in continuous areas. Accordingly, after the power switch has been turned on or recording and normal reproduction have been completed, the operation of feeding the tape T to the leading part of each sector is omitted. In other words, the operation of the MPU 51 explained in connection with Steps S8 to S10 of FIG. 3 is omitted. Accordingly, in the second embodiment, upon completion of recording, the tape T is stopped in Step S7, while upon completion of normal reproduction, the tape T is stopped in Step S23.

Since there is no sector code area, in Step S42 of FIG. 3 during search, the variable M indicative of current-address information is obtained from the address information contained in a subcode which was reproduced immediately before.

For this reason, even at the start of a search, it is not determined on which track of any still image area (V0 to V4 in FIG. 5) of the tape T the rotary heads Ha and Hb are positioned. Accordingly, although, in the example shown in FIG. 1, the variable M indicative of current-address information is compared with the variable N corresponding to a target address in Steps S45 and S46 of FIG. 3 during a search operation, the variable M is compared with (N−1) in the second embodiment. If M=(N−1), the process causes the apparatus to transfer to the normal reproduction mode; otherwise, high-speed transfer of the tape T is performed.

With the embodiment of FIG. 4 having the above-described arrangement, it is possible to quickly reproduce a desired picture by a simple operation similar to that in the embodiment of FIG. 1. In addition, since the recording format shown in FIG. 5 is formed, the number of recordable still images increases as compared with the apparatus of FIG. 1.

As is apparent from the foregoing description, according to each of the apparatus of FIGS. 1 and 4, it is possible to quickly reproduce a desired still image merely by setting the apparatus to the search mode. Accordingly, the complexity of operation which may be experienced by an operator can be extremely reduced, whereby the popularity of this kind of apparatus can be greatly increased.

Figure 7:
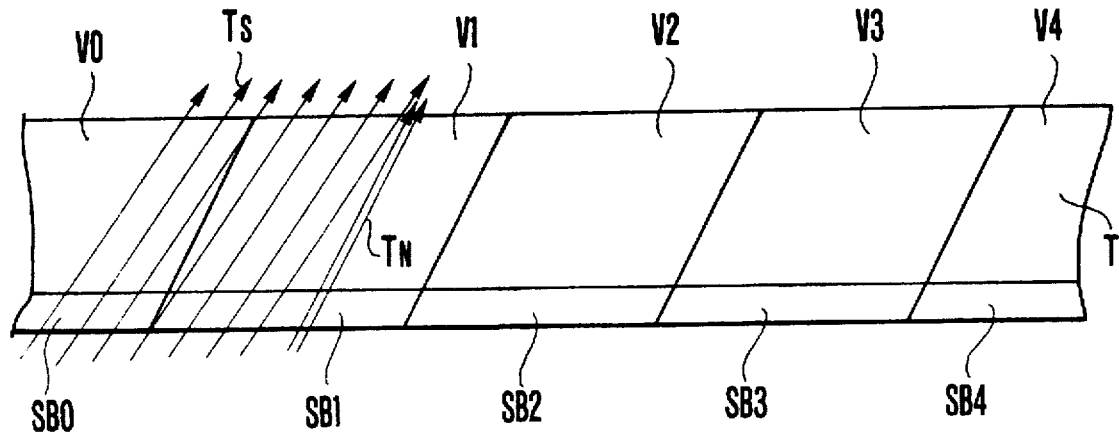
FIG. 7 is a partial schematic view showing a recording format formed on a tape by the apparatus of FIG. 6.
Figure 6:
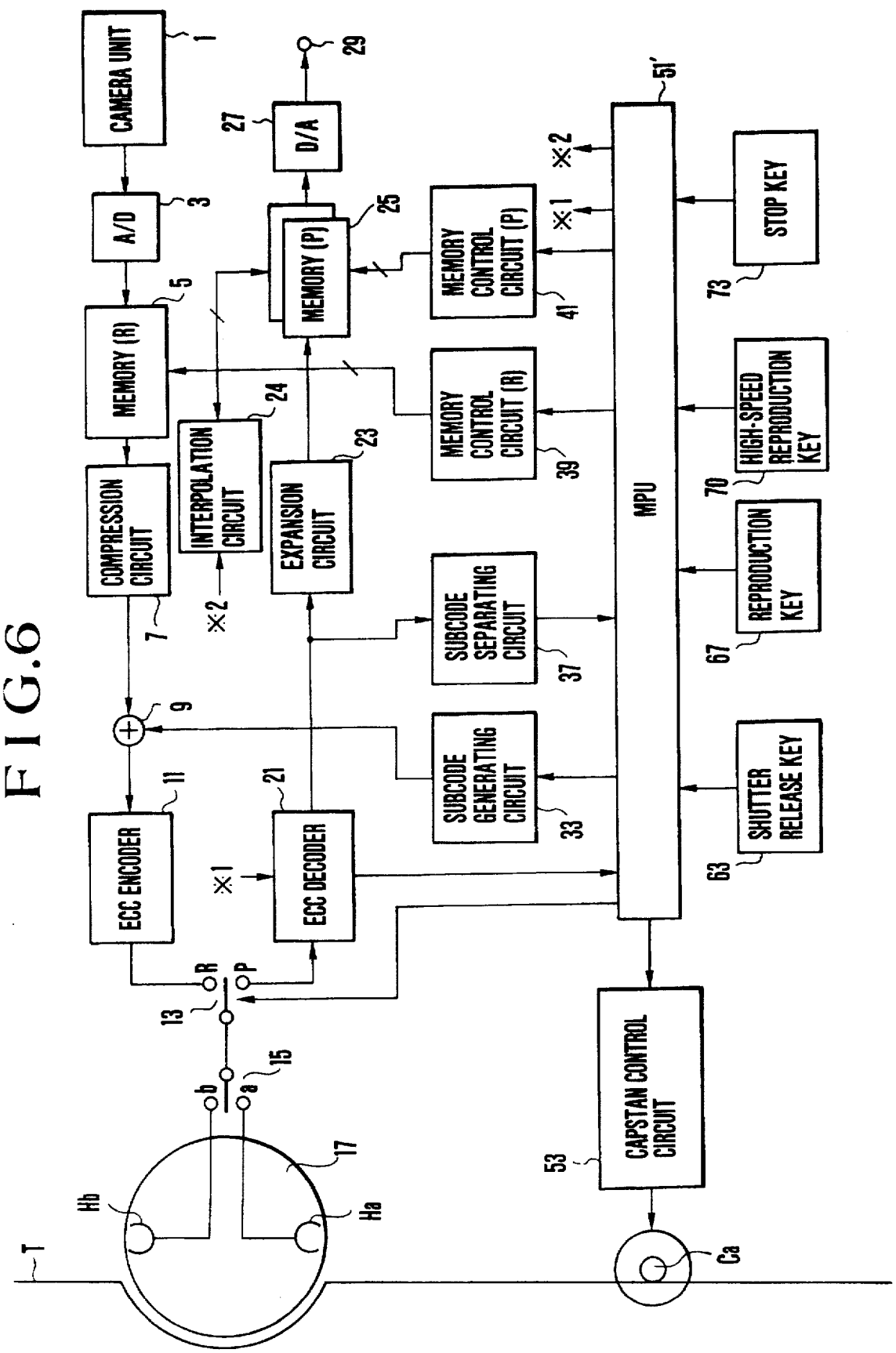
FIG. 6 is a schematic block diagram showing a digital still image recording and reproducing apparatus according to a third embodiment of the present invention.

FIG. 6 is a schematic block diagram showing a digital still image recording and reproducing apparatus according to a third embodiment of the present invention. The recording format formed on a tape by the apparatus of FIG. 6 is partially schematically shown in FIG. 7. In FIGS. 6 and 7, like reference numerals are used to denote blocks having functions substantially identical to those of the blocks shown in FIG. 1 as well as recording areas corresponding to those shown in FIG. 2.

In FIG. 6, reference numeral 70 denotes a high-speed search key for input of a high-speed search command.

Figure 8:
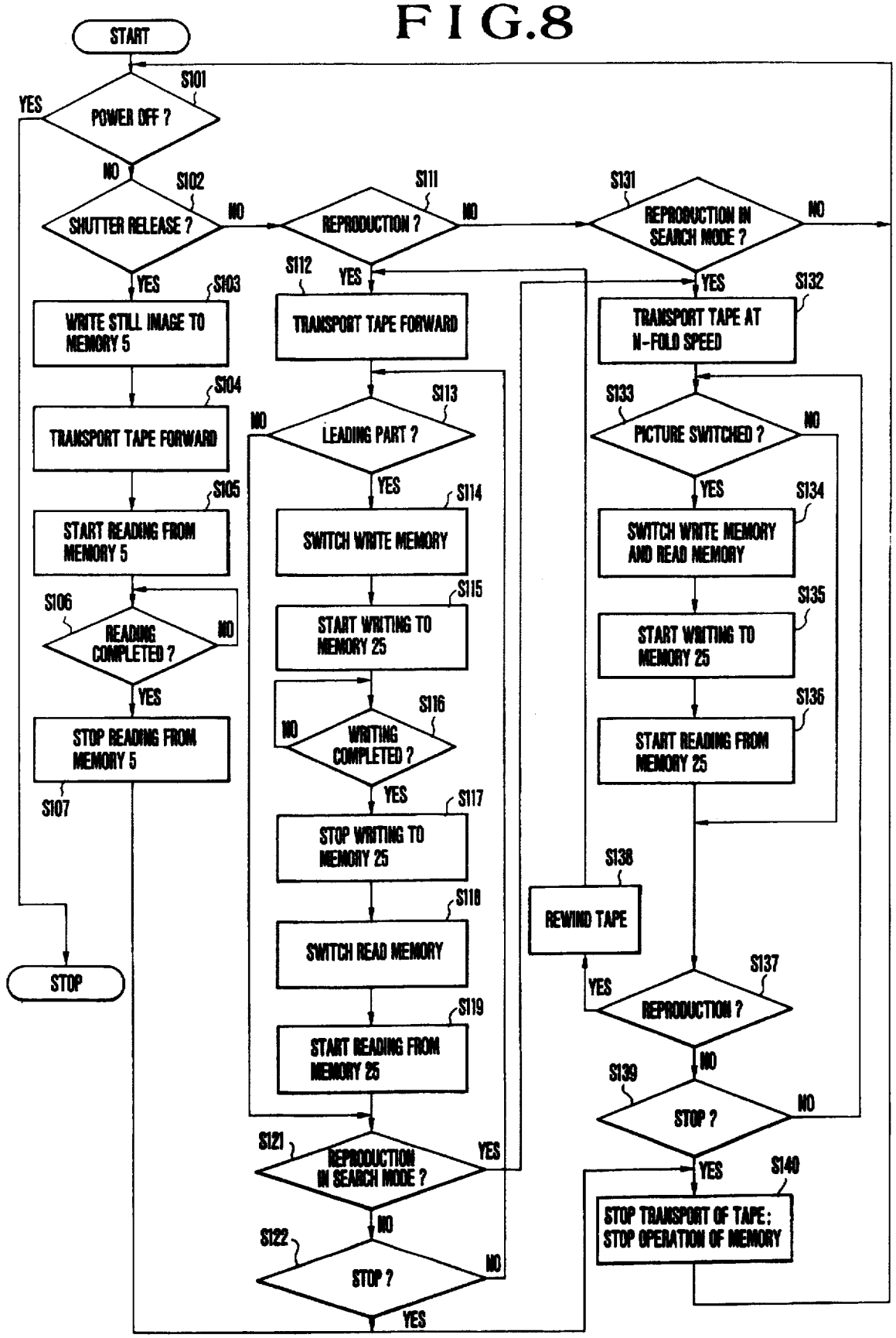
FIG. 8 is a flowchart showing the operation of the microprocessing unit (MPU) 51' shown in FIG. 6.

FIG. 8 is a flowchart showing the operation of the microprocessing unit (MPU) 51' shown in FIG. 6. The operation of the MPU 51' will be described below with reference to the flowchart of FIG. 8.

First of all, the operation of the MPU 51' during recording will be explained. When a power switch (not shown) is turned on, the flow of FIG. 8 is started to set the apparatus to the operation ready state. When the shutter release key 63 is operated with the apparatus placed in the operation ready state (Step S102), a video signal for one frame outputted from the camera unit 1 is converted into a digital signal in the A/D converter 3 and the result is written to the frame memory (R) 5 (Step S103), as in the case of the flowchart of FIG. 3.

The operation of the MPU 51' shown in Steps S103 to S107 is similar to that of the MPU 51 shown in Steps S3 to S7 of FIG. 3, and detailed description is omitted. In the third embodiment, since no sector code area is present, the process proceeds from Step S107 to Step S140, where the tape T is stopped and reading from the memory 5 is stopped. Then, the process causes the apparatus to return to the operation ready state.

The operation of the still image recording and reproducing apparatus according to the third embodiment during normal reproduction will be described below.

If the reproduction key 67 is operated with the apparatus placed in the operation ready state (Step S111), the MPU 51' performs, in Steps S112 to S119, operations similar to the operations shown in Steps S12 to S19 of FIG. 3. During reproduction, each time a data block of error correction codes is generated by the ECC decoder 21, an error flag is supplied to the MPU 51'.

An interpolation circuit 24 accesses the memories (P) 25 and interpolates pixel information, which is not correctable for error, by using information relative to adjacent pixels in response to a control signal *2 generated by the MPU 51' in accordance with the aforesaid error flag. The interpolation circuit 24 forms interpolated still image information.

It is substantially impossible to find the track of any still image area which is being traced by the rotary heads Ha and Hb at the instant when transport of the tape T is started. In addition, it is substantially impossible to reproduce a perfect still image from only a reproduced signal obtained from the middle portion of each still image area. To overcome these problems, the third embodiment is arranged to memorize still image information in either of the two frame memories 25 in sequence from the information recorded on the leading track of a still image area which follows a still image area which is being traced by the rotary heads Ha and Hb when transport of the tape T is started. More specifically, after tape transport has been started, if it is detected that a track having image information to be reproduced is the first track of each still image area on the basis of the aforesaid track information which has been separated by the subcode separating circuit 37 in Step S113, this indicates that the leading part of each still image area has been detected.

If the stop key 73 is operated with the apparatus placed in the normal reproduction state (Step S122), the transport of the tape T is stopped and the read and write operations of the memories (P) 25 are stopped (Step S140). The process causes the apparatus to return to the aforesaid operation ready state.

The operation of the apparatus in a high-speed reproduction mode will be described below.

In the third embodiment, it is possible to transfer the apparatus to the high-speed reproduction mode by operating the high-speed reproduction key 70 with the apparatus placed in the operation ready state or the reproduction state (Steps S121 and S131).

When the high-speed reproduction mode is set, the MPU 51' causes the capstan control circuit 53 to rotate the capstan Ca at a high speed, thereby transporting the tape T forward at a speed n times as high as the speed at which it is transported during recording (Step S132).

In the above-described state, the loci of traces of the respective heads Ha and Hb intersect the longitudinal axes of the respective tracks as indicated by arrows in FIG. 7, whereby the length of each code string which is continuously reproduced is reduced. In response to such a reduction in the code string length, the ECC decoder 21 switches an error code correction mode in accordance with the control signal *1 supplied from the MPU 51'. For example, if two-correction has been performed by each error correction code word during normal reproduction, the ECC decoder 21 selects one-correction processing. Otherwise, correction is performed not by inside codes of a product code but by outside codes. This is because if it is continuously impossible to reproduce a code string for a long time period, it is difficult to effect error correction, particularly by using inside codes.

In this state, the MPU 51' continues to monitor the aforesaid address information separated by the subcode separating circuit 37. If the address information varies, it indicates that the tracing of the rotary heads Ha and Hb has transferred from one still image area to the succeeding still image area. If the MPU 51' detects that fact (Step S133), image information is read from the one of the frame memories (P) 25 to which the image information has just been written, and writing to the other frame memory whose image information has just been read out is started (Steps S134 to S136).

Since only a part of the whole pixel information is restored in the above-described case, the remaining pixel information is obtained by the interpolation of the interpolation circuit 24. The D/A converter 27 provides at the output terminal 29 a video signal which corresponds to the still image recorded in a still image area immediately before a still image area which is being traced by the rotary heads Ha and Hb. In this state, if tracing transfers to the succeeding still image area, the succeeding still image is outputted through the operations shown in Steps S134 to S136. For example, if it takes 10 seconds to record a still image for one picture, still images are displayed one after another every two seconds by a 5-fold search.

In the third embodiment, it is possible to cause the apparatus to transfer to the normal reproduction mode by operating the reproduction key 67 in such a high-speed reproduction state. More specifically, if the reproduction key 67 is operated during the high-speed reproduction mode (Step S137), the capstan control circuit 53 transports the tape T backward by a predetermined amount (Step S138). This is because, as previously described, still images which are being outputted during high-speed reproduction are the still images which are recorded in a still image area immediately before a still image area which is currently being traced and if transfer to the normal reproduction mode is performed without the backward transport of the tape T, reproduction will start with a still image recorded in a still image area following the still image area which is currently being traced. In other words, if the transfer to the normal reproduction mode is only performed in a simple way, the still images recorded in a still image area which is being traced during mode transfer are not reproduced. In addition, even if the mode of the apparatus is switched to the normal reproduction mode when a desired picture has been outputted in the high-speed reproduction mode, it is impossible to reproduce that picture.

According to the third embodiment, the amount of tape to be rewound at the time of switching from the high-speed reproduction mode to the normal reproduction mode is selected to be equivalent to approximately two still image areas, that is, still images for approximately two pictures. Accordingly, when a still image is being outputted which is recorded in a still image area immediately before the still image area which is being traced in the high-speed reproduction mode, the aforesaid tape rewinding permits tracing to return to a still image area which is two areas previous to the still image area which is being traced, so that normal reproduction can be started with the still image information recorded in the immediately previous still image area. In other words, it is possible to reproduce a still image displayed on a monitor or the like in the normal reproduction mode by operating the reproduction key 67 when the apparatus is operating in the high-speed reproduction mode. Accordingly, an operator needs only to operate the reproduction key 67 when a desired still image is displayed in the high-speed reproduction mode, whereby a search can be conducted extremely easily.

The aforesaid example in which the amount of tape rewinding is selected to be equivalent to approximately two pictures is based on the assumption that transport of the tape T can be ideally controlled. The amount of tape rewinding may be appropriately determined depending on inertia inherent in the capstan 53. To allow for a number of factors such as the start-up conditions of a motor and tracking stability during the normal reproduction mode, the amount of tape rewinding may be increased if reproduction is to be started with a still image area which is two areas ahead of a still image area which is being traced during transfer to the normal reproduction mode.

If the stop key 73 is operated during the high-speed reproduction state (Step S139), the transport of the tape T is stopped and writing to the memory (P) 25 is stopped (Step S140). The process causes the apparatus to return to the aforesaid operation ready state.

In the embodiment shown in FIG. 6, by turning off the power switch (not shown) in the aforesaid operation ready state (Step S101), the processing according to the flowchart of FIG. 8 is brought to an end.

In the above-described apparatus according to the third embodiment, during the high-speed reproduction mode in which reproduction is performed while the tape T is being transported at a speed which is n times as high as that during forward recording, even if the reproduction key 67 is operated to cause the high-speed reproduction mode to transfer to the normal reproduction mode, a still image which is outputted in the high-speed reproduction mode is initially reproduced. Accordingly, the above-described embodiment realizes an apparatus which is easy for an operator to use, and the operator can easily search a desired picture.

The above description of the third embodiment only refers to what is called a forward high-speed reproduction mode in which reproduction is performed while a tape is being transported forward at a high speed. However, a backward high-speed reproduction mode is also possible in which reproduction is performed while a tape is being transported backward at a high speed. When the apparatus is in such a backward high-speed reproduction mode, even if the tape is not transported during mode transfer by the operations shown in Steps S132 to S136, a still image which is outputted in the high-speed reproduction mode is necessarily reproduced even during the normal reproduction mode. It is to be noted that even during the backward high-speed reproduction mode, if the inertia of the capstan Ca is extremely large, it may be necessary to perform processing such as transfer to the normal reproduction mode after the tape has been transported forward by a predetermined amount.

As is apparent from the foregoing description, according to the present invention, if a desired still image is reproduced in the high-speed reproduction mode, it is possible to reproduce the desired still image merely by switching the high-speed reproduction mode to the normal reproduction mode. Accordingly, an operator can perform an easy operation to quickly reproduce a desired still image.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A still image signal reproducing apparatus comprising:
(a) a reproducing head for tracing a tape-shaped recording medium on which a multiplicity of helical tracks are formed for a plurality of pictures of still image information and numeral information for respective pictures of the still image information, each picture of the still image information being recorded on a plurality of helical tracks among the multiplicity of helical tracks, each of the numeral information being repeatedly recorded on the plurality of helical tracks and the numeral information for one picture of the still image information being recorded on a plurality of helical tracks for one picture, respectively, said numeral information increasing every still picture according to an order of reproduction of said plurality of still picture information in a normal reproducing mode;
(b) transporting means for transporting the tape-shaped recording medium in the longitudinal direction thereof;
(c) still image reproducing means for reproducing the still image information by using an output from said reproducing head;
(d) numeral reproducing means for reproducing the numeral information by using the output from said reproducing head;
(e) memory means for storing the still image information;
(f) numeral inputting means for manually inputting desired numeral which indicates a desired picture of the still information to generate desired numeral information;
(g) discrimination means for discriminating whether a difference between the numeral information reproduced by said numeral reproducing means and the manually input desired numeral information becomes equal to a predetermined integer which is represented by a difference between said manually input desired numeral information and numeral information indicating a predetermined picture of still image information to be reproduced in the normal reproducing mode, said predetermined picture of still image information being recorded in a neighborhood of and preceding said desired picture of the still image information, and for detecting said predetermined picture of still image information in accordance with the discriminated result; and (h) mode switching means for switching said apparatus between a plurality of modes including a reproducing mode in which said transporting means transports the tape-shaped recording medium at a first speed and said still image reproducing means reproduces the still image information and a search mode in which said transporting means transports the tape-shaped recording medium at a second speed which is faster than the first speed and said numeral reproducing means reproduces the numeral information, said mode switching means effecting mode switching from the search mode to the reproduction mode at a position in which said predetermined picture of still image information is recorded, according to the detection result of said discrimination means in the search mode, and said memory means, after the mode of said apparatus has been switched from the search mode to the reproduction mode according to the output of said discrimination means, initiating storing still image information which corresponds to a signal reproduced from a first track among the plurality of tracks in which said desired picture of still image information is recorded.

2. An apparatus according to claim 1, wherein the tape-shaped recording medium is divided into sectors having a plurality of helical tracks in the longitudinal direction thereof, said still image reproducing means including detecting means for detecting that a sector code recorded in a leading part of each of the sectors has been reproduced, and initiating writing to said memory in response to an output from said detecting means.

3. An apparatus according to claim 1, wherein said mode switching means includes search operating means for setting said apparatus to the search mode, said search operating means setting said apparatus to the search mode in response to a manual input to said search operating means.

4. An apparatus according to claim 3, wherein said mode switching means further includes inhibiting means for inhibiting said apparatus from transferring to the search mode when numeral information reproduced by said address reproducing means immediately after the operation of said search operating means coincides with the desired numeral information.

5. An apparatus according to claim 4, wherein said mode switching means further includes decision means for comparing the desired numeral information with the numeral information reproduced by said numeral reproducing means immediately after the operation of said search operating means and determining the direction in which the tape-shaped recording medium is transported by said transporting means in the search mode.

6. An apparatus according to claim 1, further comprising: generation means for generating comparison data having a value different from the value of said manually input desired numeral information according to said manually input desired numeral information.

7. An apparatus according to claim 6, wherein said discrimination means has comparison means for comparing the comparison data generated by said generation means with the numeral information reproduced by said reproducing means.

8. An apparatus according to claim 6, wherein said generation means uses as the comparison data a value obtained by adding the predetermined integer to the value of said manually input desired numeral information.

9. A still image signal reproducing apparatus comprising:

(a) still image reproducing means for reproducing still image information from a tape-shaped recording medium on which a multiplicity of helical tracks are formed for a plurality of pictures of still image information and numeral information for respective pictures of the still image information, each picture of the still image information being recorded on a plurality of helical tracks among the multiplicity of helical tracks, each of the numeral information being repeatedly recorded on the plurality of helical tracks and the numeral information for one picture of the still image information being recorded on a plurality of helical tracks for the picture, respectively, said numeral information increasing every still picture according to an order of reproduction of said plurality of still picture information in a normal reproducing mode;

(b) numeral reproducing means for reproducing the numeral information from the tape-shaped recording medium;

(c) transporting means for transporting the tape-shaped recording medium in the longitudinal direction thereof;

(d) numeral inputting means for manually inputting desired numeral to generate numeral information;

(e) memory means for storing the still image information;

(f) discrimination means for discriminating whether a difference between the numeral information reproduced by said numeral reproducing means and the manually input desired numeral information becomes equal to a predetermined integer which is represented by a difference between said manually input desired numeral information and numeral information indicating a predetermined picture of still image information to be reproduced in the normal reproducing mode, said predetermined picture of still image information being recorded in a neighborhood of and preceding said desired picture of still image information, and for detecting said predetermined picture of still image information in accordance with the discriminated result; and (g) speed switching means for switching the transporting speed of the tape-shaped recording medium according to the output of said discrimination means, said memory means, after the speed of the tape-shaped recording medium has been switched from a first speed to a second speed which is slower than the first speed according to the output of said discrimination means, initiating storing the still image information which corresponds to a signal reproduced from a first track among the plurality of tracks in which said desired picture of still image information is recorded.

10. A still image signal reproducing apparatus comprising:

(a) still image reproducing means for reproducing still image information from a tape-shaped recording medium on which a multiplicity of helical tracks are formed for a plurality of pictures of still image information and numeral information for respective pictures of the still image information, each picture of the still image information being recorded on a plurality of helical tracks among the multiplicity of helical tracks, each of the numeral information being repeatedly recorded on the plurality of helical tracks and the numeral information for one picture of the still image information being recorded on a plurality of helical tracks for one picture, respectively, said numeral information increasing every still picture according to an order of reproduction of said plurality of still picture information in a normal reproducing mode;

(b) numeral reproducing means for reproducing the numeral information from the tape-shaped recording medium;

(c) transporting means for transporting the tape-shaped recording medium in the longitudinal direction thereof;

(d) numeral inputting means for manually inputting desired numeral to generate desired numeral information;

(e) memory means for storing the still image information;

(f) discrimination means for discriminating whether a difference between the numeral information reproduced by said numeral reproducing means and the manually input desired numeral information becomes equal to a predetermined integer which is represented by a difference between said manually input desired numeral information and numeral information indicating a predetermined picture of still image information to be reproduced in the normal reproducing mode, said predetermined picture of still image information being recorded in the neighborhood of and preceding said desired picture of still image information, and for detecting said predetermined picture of still image information in accordance with the discriminated result; and (g) mode switching means for switching said apparatus between a plurality of modes including a reproduction mode in which said still image reproducing means reproduces the still image information and a search mode in which said still image reproducing means does not reproduce the still image information according to the output of said discrimination means, said memory means, after the mode of said apparatus has been switched from the search mode to the reproduction mode according to the output of said discrimination means, initiating storing still image information which corresponds to a signal reproduced from a first track among the plurality of tracks in which said desired picture of still image information is recorded.

11. An image reproducing apparatus, comprising:

(a) reproducing means for reproducing digital image signals and numeral data for respective pictures of the digital image signals from a plurality of helical tracks on a tape-shaped recording medium, each picture of the digital image signals being recorded on the plurality of helical tracks, the numeral data being repeatedly recorded on the plurality of helical tracks and the numeral data for one picture of the digital image signals being recorded on a plurality of helical tracks for the picture, respectively, the numeral data increasing every picture according to an order of reproduction of the digital image signals in a normal reproduction mode;

(b) transporting means for transporting the tape-shaped recording medium in the longitudinal direction thereof;

(c) numeral inputting means for manually inputting desired numeral to generate desired numeral information;

(d) memory means for storing the digital image signal reproduced by said reproducing means;

(e) discrimination means for discriminating whether a difference between the numeral data reproduced by said reproducing means and the desired numeral information becomes equal to a predetermined value which is represented by a difference between the desired numeral information and numeral information indicating a predetermined picture of the digital image signals to be reproduced in the normal reproducing mode, said predetermined picture of the digital image signals being recorded in a neighborhood of and preceding the desired picture of the digital image signals, and for detecting the predetermined picture of the digital image signals in accordance with the discrimination result; and (f) control means for switching the transporting speed of the tape-shaped recording medium according to the output of said discrimination means, said memory means, after the speed of the tape-shaped recording medium has been switched from a first speed to a second speed which is slower than the first speed according to the output of said discrimination means, initiating storing the digital image signals which corresponds to a signal reproduced from a first track among the plurality of tracks in which the desired picture of the digital image signals is recorded.

12. An apparatus according to claim 11, wherein error correction check codes are added to the digital image signals, and wherein said reproducing means comprises error correction means for correcting errors in the digital image signals by using the error correction check codes.

13. An apparatus according to claim 11, wherein said memory means stores a plurality of pictures of the digital image signals.

14. An apparatus according to claim 11, wherein an information amount of the digital image signals is compressed.

15. An apparatus according to claim 14, further comprising expansion means for expanding the information amount of the digital image signals reproduced by said reproducing means.

16. An apparatus according to claim 11, wherein said reproducing means has a rotary head for tracing the tape-shaped medium.

17. A still image signal reproducing apparatus for reproducing a plurality of pictures of still image information and numeral information for respective pictures of the still image information from a multiplicity of helical tracks being formed on a tape-shaped recording medium each picture of the still image information being recorded on a plurality of helical tracks among the multiplicity of helical tracks, each of the numeral information being repeatedly recorded on the plurality of helical tracks and the numeral information for one picture of the still image information being recorded on a plurality of helical tracks for one picture, respectively, the numeral information increasing every picture according to an order of reproduction of the plurality of pictures of still image information at a normal reproducing mode, comprising:

(a) reproducing means for reproducing the still image information and the numeral information from the tape-shaped recording medium;

(b) transporting means for transporting the tape-shaped recording medium;

(c) numeral input means for manually inputting desired numeral which indicates a desired picture of the still information to generate desired numeral information;

(d) detection means for comparing the numeral information reproduced by said numeral reproducing means and the manually input desired numeral information, and detecting, in accordance with the result thus compared, a predetermined picture of still image information to be reproduced in the normal reproducing mode, said predetermined picture of still information being recorded in a neighborhood of and preceding said desired picture of still image information; and (e) mode switching means for switching said apparatus between a plurality of modes including a reproducing mode in which said transporting means transports the tape-shaped recording medium at a first speed and said reproducing means reproduces the still image information and a search mode in which said transporting means transports the tape-shaped recording medium at a second speed which is faster than the first speed and said reproducing means reproduces the numeral information, said mode switching means effecting mode switching from the search mode to the reproduction mode at a position in which said predetermined picture of still image information is recorded, according to the detection result of said detection means.

18. An apparatus according to claim 17, wherein the still image information includes digital still image data.

19. An apparatus according to claim 18, wherein error correcting code are added to the digital still image data, errors in the digital still image data being corrected by using the error correcting code.

20. An apparatus according to claim 17, further comprising storing means for storing the still image information reproduced by said reproducing means.

21. An apparatus according to claim 20, wherein said storing means stores plural pictures of the still image information.

22. An apparatus according to claim 17, wherein an amount of the still image information is compressed.

23. An apparatus according to claim 22, further comprising expansion means for expanding the amount of the still image information reproduced by said reproducing means.

24. An apparatus according to claim 17, wherein said reproducing means having a rotary head for tracing the tape-shaped recording medium.

* * * * *

UNITED STATES PATENT AND TRADEMARK OFFICE
CERTIFICATE OF CORRECTION

PATENT NO. : 5,895,122
DATED : April 20, 1999
INVENTOR(S) : Kenichi Nagasawa, et al.

It is certified that error appears in the above-identified patent and that said Letters Patent is hereby corrected as shown below:

Title page [54], delete "STILL IMAGE REPRODUCING APPARATUS" and insert
--STILL IMAGE REPRODUCING APPARATUS FOR REPRODUCING STILL IMAGES FROM A PLURALITY OF HELICAL TRACKS ON A TAPE-SHAPED RECORDING MEDIUM--.

Column 1, line 33, delete "is" and insert --are--.

Signed and Sealed this

Fourth Day of April, 2000

*Attest:*

Q. TODD DICKINSON

*Attesting Officer*  *Director of Patents and Trademarks*